W. B. CLAPP.
CRANBERRY PICKER.
APPLICATION FILED NOV. 29, 1918.

1,354,283.

Patented Sept. 28, 1920.
2 SHEETS—SHEET 1.

INVENTOR:
William B. Clapp
by Macleod, Calver, Copeland & Price
Attys.

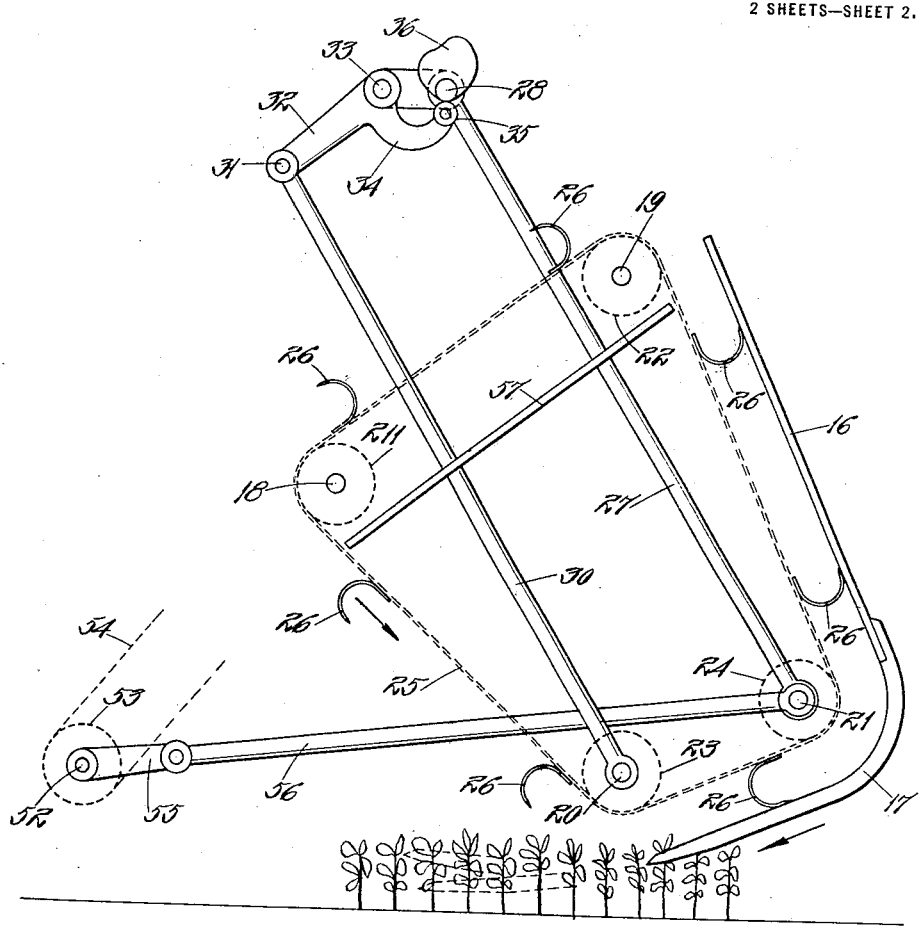
Fig-4-
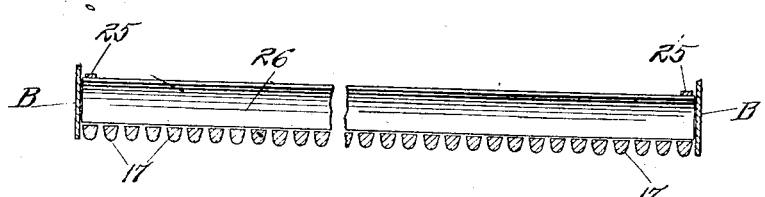
Fig-3-
INVENTOR:
William B. Clapp
by Macleod, Calver, Copeland & Dike
Attys.

UNITED STATES PATENT OFFICE.

WILLIAM B. CLAPP, OF ABINGTON, MASSACHUSETTS.

CRANBERRY-PICKER.

1,354,283.  Specification of Letters Patent.  Patented Sept. 28, 1920.

Application filed November 29, 1918. Serial No. 264,515.

*To all whom it may concern:*

Be it known that I, WILLIAM B. CLAPP, a citizen of the United States, residing at Abington, county of Plymouth, State of Massachusetts, have invented a certain new and useful Improvement in Cranberry-Pickers, of which the following is a specification, reference being had therein to the accompanying drawings.

The invention relates to a new and useful improvement in cranberry picking machines. One object of the invention is to provide a machine which may be propelled over the surface of the cranberry bog and which will gather the cranberries from the vines while it is traveling. Another object of the invention is to provide means whereby the propelling mechanism for the machine also actuates the cranberry picking members. Another object of the invention is to provide a plurality of picker fingers which are actuated in such manner as to swing in a direction opposite to the direction of travel of the machine to gather the cranberries from the vines and then swing backward for another stroke and to provide scoops which travel in the opposite direction to the picking movement of the fingers and scoop the cranberries from the fingers as they are gathered from the vines and deposit them in a suitable receptacle connected with the machine.

The several features enumerated above and other features of the invention will be more fully set forth and claimed in the specification.

The invention will be fully understood from the following description when taken in connection with the accompanying drawings and the novel features thereof will be pointed out and clearly defined in the claims at the close of this specification.

In the drawings, Figure 1 is a side elevation of a machine embodying the invention.

Fig. 3 is a sectional view on line 3—3 of Fig. 1.

Fig. 4 is a side elevation showing the machine in operation with the picker fingers about to scoop the berries from the vines and showing in dotted lines the picker fingers after they have made the forward stroke into the vines, some of the detailed parts of the machine being omitted for clearness of illustration of the picker and scoop and the operating mechanism.

Figure 1:
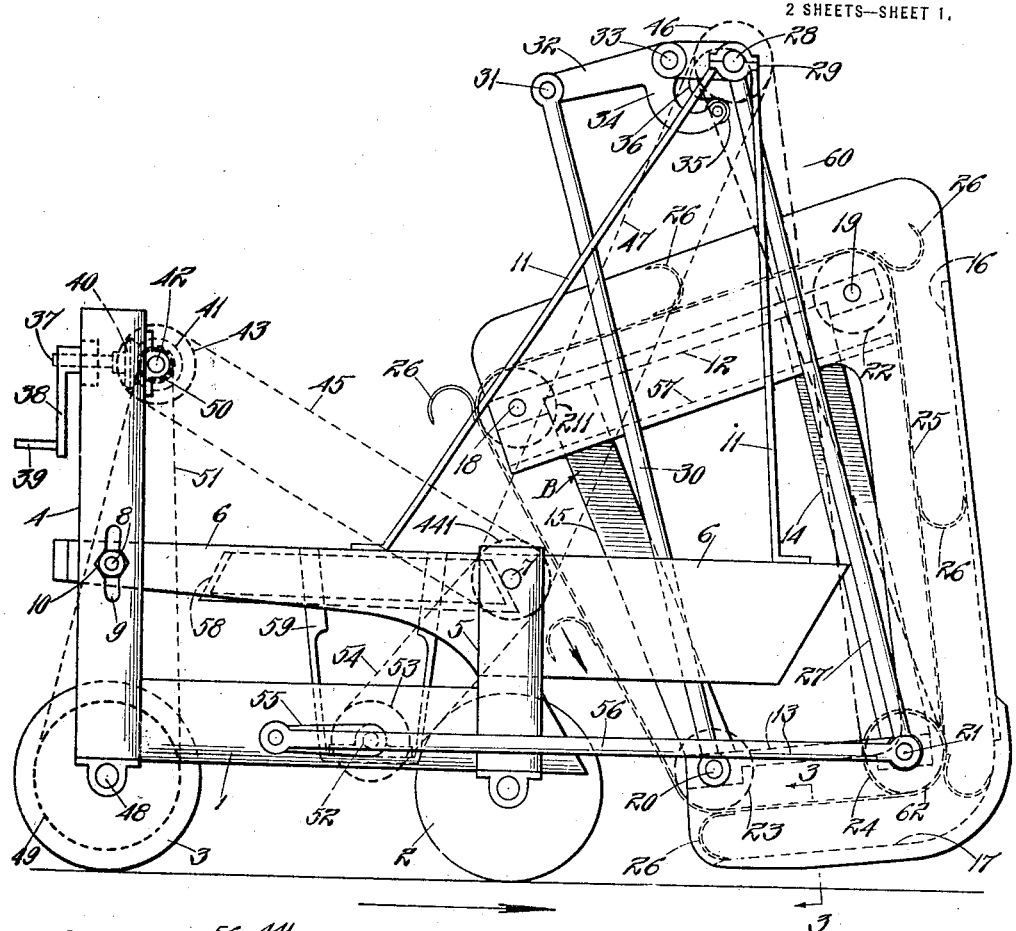
Figure 2:
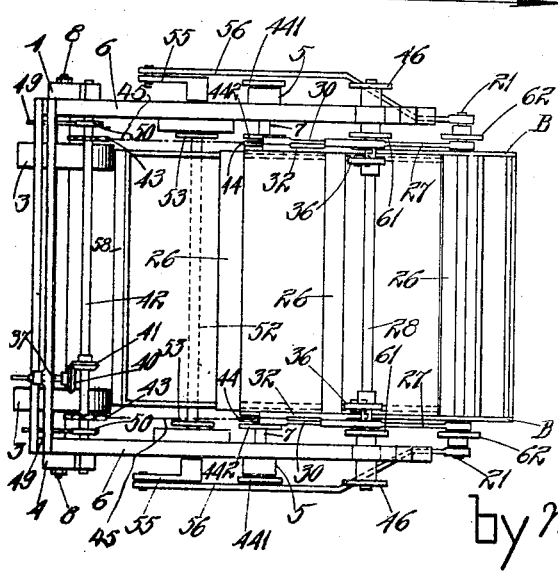
Fig. 2 is a plan view of the machine shown in Fig. 1 but on a smaller scale.

Referring now to the drawings, a frame body or base portion 1 is provided with a forward set of wheels 2 and a rear set of wheels 3 on which said body 1 is suitably mounted so that it may be carried by the movement of the wheels. Preferably there are two forward wheels 2 and two rear wheels 3, each pair of wheels mounted on an axle in any suitable manner, it not being deemed necessary to show the details either of the frame body 1 or of the axles.

Rising from the rear part of the body 1 on each side and rigidly connected therewith is an upright portion 4, and rising from the forward end of the body 1 on each side is an upright portion 5 which as shown is somewhat less in height than the rear upright portion 4.

A second frame portion 6 is pivoted intermediate its ends on studs 7 which project from the upright members 5, the rear end of said frame member 6 being connected on each side by means of a stud 8 with a slot 9 in one of the upright members 4. Said slot 9 is elongated in a vertical direction with an arc shaped rear wall so that the member 6 may be rocked slightly on the center pivot 7, the stud 8 which engages with the slot 9 traveling in an arcuate path as permitted by the arc shaped slot 9. The frame member 6 is intended to be rocked or moved on the pivot 7 only for the purpose of adjustment for the purpose to be hereinafter described, and it is clamped in its adjusted position by means of a nut 10 screwed onto the threaded end of the stud 8 which will clamp the member 6 firmly against the upright member 4.

Mounted rigidly on the upper side of the frame portion 6 is a bracket 11. A skeleton picker supporting frame B has a top portion 12, a bottom portion 13 and two side portions 14, 15 all rigidly connected together. In Fig. 1 this frame B is shown in end view from one side of the machine. The opposite end of the frame is similarly constructed and said frame extends transversely of the body of the machine.

Secured to the front, that is the right hand side of the frame B as viewed in Fig. 1, is a picker carrying plate 16 which extends down at some distance out in front of the front portion 14 of the frame B, and secured to the lower end of said picker plate 16 are the curved picker fingers 17 which as shown are curved to extend rearwardly beneath the base 1 toward the rear end of the machine. There are a plurality of these picker fingers 17 placed apart as shown in Fig. 3.

At the four corners of the frame B as viewed in Fig. 1 are shafts or studs 18, 19, 20 and 21 respectively which are journaled in boxes connected with the frame and on these studs or shafts are mounted sprockets 211, 22, 23 and 24 respectively. There is a set of these studs and sprockets on each side of the machine. Over these sprockets there runs an endless chain or carrier 25 on which are mounted a series of scoops 26 of semi-cylindrical trough shape, being somewhat arc shaped in end view as shown in Fig. 1. These scoops are of such size that on the under run of the chain or carrier 25 the lower edge of the scoop will extend down just to the upper faces of the picker fingers 17 and scrape along over the upper face of the picker fingers when the machine is in operation so as to scoop the berries from the fingers.

Each lower forward shaft or stud 21 of the picker carrying frame is pivotally connected with the lower end of a rod 27. The upper end of each rod 27 is pivotally connected by means of a shaft 28 with a head 29 of the bracket 11 so that the rods 27 are capable of a sort of pendulum movement thereby permitting a forward and backward swinging movement of the picker carrying frame.

Connected with the lower rear shaft 20 of the picker carrying frame at opposite sides of the machine are upwardly extending rods 30 the upper end of each of which is pivotally connected at 31 with a lever 32 which is fulcrumed intermediate its ends at 33 and has a forwardly extending curved arm 34 which carries a roll 35, said roll 35 engaging with the surface of a cam 36 mounted on shaft 28. If the cam 36 is rotated, it will by reason of engagement with the roller 35 actuate the lever 32 and thereby through the connecting rods 30 give a rocking movement to the picker carrying frame.

Journaled in the frame of the machine is a shaft 37 which may be rotated in any suitable manner and constitutes the main driving shaft of the machine. In the device shown the shaft 37 is provided with a crank 38 having a handle 39 by which the shaft 37 may be operated by hand. Mounted on the shaft 37 is a bevel gear 40 which engages with a bevel gear 41 mounted on a shaft 42 which is journaled in a part of the frame. Mounted on the shaft 42 near each end is a sprocket 43 and mounted on the pivot stud 7 of the adjustable frame 6 is a sprocket 44. On each side of the machine a chain 45 runs over the sprockets 43 and 44. Mounted on the shaft 28 in the head of the bracket 11 are sprockets 46. Chains 47 run over said sprockets 46 and over sprockets 441 on studs 7 so that when the main shaft 37 is rotated the chains 45 will drive the sprockets 44 and studs 7 and thereby through the chains 47 will drive the sprockets 46 and rotate the shaft 28 and cams 36.

Mounted on the axle 48 on which the rear or driving wheels 3 are mounted are sprockets 49. Sprockets 50 are mounted on the shaft 42 and chains 51 run around the sprockets 50 and sprockets 49 so that when the driving shaft 37 is rotated the driving wheels 3 will also be rotated.

Journaled in a bracket 59 hung from the adjustable frame 6 is a shaft 52 on which are respectively mounted sprockets 53 connected by chains 54 with the sprockets 442 on the shaft 7 so that said shaft 52 is rotated by the main driving shaft 37 through the intermediate connections.

Mounted fast on the shaft 52 at each side of the machine is a crank 55 which is connected with one end of a rod 56, the other end of said rod 56 being connected with the shaft 21 on which the picker frame B is pivoted.

The shaft 21 is driven by shaft 28 through chains 60 which run over sprockets 61 on shaft 28 and sprockets 62 on shaft 21. This drives the sprockets 24 on shaft 21, and thus drives the carrier chains 25 and the idler sprockets 22, 211 and 23.

When the shaft 52 is rotated, thus actuating the cranks 55, the connecting rods 56 will be given a forward and back movement thus swinging forward and back the picker frame to swing the picker fingers in a direction toward the rear end of the machine, that is the left hand end as viewed in Fig. 1, to swing the picker fingers through the vines in the opposite direction to the travel of the machine to strip the berries from the vines.

The cam 36 is so shaped and adjusted that after the picker fingers have moved through the vines as just described, the connecting rod 30 will be given an upward movement thereby causing the picker carrying frame to tilt upward on the pivot 21 thus causing the ends of the fingers 17 to rise slightly as shown in the upper dotted position in Fig. 4 so as to lift the picker fingers out from the vines and strip the cranberries therefrom.

During all this operation the endless chain 25 will be moving so that the scoops 26 will scoop the berries from the upper sides of the picker fingers and carry them upward. As soon as the scoops 26 have passed to the upper end of their travel and begun their backward run they will turn upward as shown by the uppermost scoops in Fig. 1 so that the berries will run out of the scoops. An inclined fall board 57 is provided on which the berries will fall from the scoops and thence they will slide down and drop into a suitable box 58 mounted on the frame 6.

By reason of the elongated slot 9 the left hand end of the frame 6 may be adjusted to a higher or lower position as already stated. By raising it to a higher position the bracket 59 will be raised and therefore the crank shaft 52 will be raised and change the line of stroke of the connecting rod 56. It will also cause the right hand end of the frame 6 to drop lower and thereby lower the upper pivot shaft 28, thereby lowering the swinging frame B which carries the pickers so that the picker fingers will sweep nearer the ground than before. By adjusting the frame 6 so that its left hand end will be lower it will thereby raise the swinging frame B and cause the picker to sweep at a higher distance from the ground. Thus the machine may be adjusted to accommodate, according to whether the cranberry vines are shorter or taller.

What I claim is:

1. A cranberry picking machine having wheels on which it is mounted, means for actuating the wheels and thereby propelling the machine on the surface of the ground, picker fingers oscillatably mounted in such manner that on their stripping stroke they will move in a direction opposite to the direction of travel of the machine on the ground, a series of scoops mounted to travel just above the picker fingers, means whereby the mechanism for driving the wheels which propel the machine also actuates the picker fingers and the scoops, and means whereby the scoops travel in the opposite direction to the direction of the forward movement of the picker fingers.

2. A cranberry picking machine having wheels on which it is mounted, means for actuating the wheels and thereby propelling the machine on the surface of the ground, picker fingers oscillatably mounted in such manner that on their stripping stroke they will move in a direction opposite to the direction of travel of the machine on the ground, a series of scoops mounted to travel just above the picker fingers, means whereby the mechanism for driving the wheels which propel the machine also actuates the picker fingers and the scoops, means whereby the scoops travel in the opposite direction to the direction of the forward movement of the picker fingers, means whereby the picker fingers are given first a horizontal movement to engage beneath the berries of the vines, means whereby the said fingers are given an upward movement after an initial horizontal movement, and means for controlling the sequence of movements of the picker fingers.

3. A cranberry picking machine having picker members to strip the berries from the vines, scoop members to scoop the berries from the strippers, and means for actuating the strippers and scoops to travel in opposite directions to each other.

4. A cranberry picking machine having picking members to strip the berries from the vines, scoop members to scoop the berries from the strippers, a mount for said strippers and scoops, means for propelling the mount along on the ground, and means controlled by the said propelling mechanism to actuate the strippers and scoops in opposite directions to each other.

5. A cranberry picking machine having stripping members to strip the berries from the vines, scoop members to scoop the berries from the strippers, a mount for said strippers and scoops, means for propelling the mount along on the ground, means controlled by the said propelling mechanism to actuate the strippers and scoops in opposite directions to each other, and means whereby the strippers are caused to move on their stripping stroke in a direction opposite the general direction of travel of the machine and to have a return stroke in the general direction of the travel of the machine.

6. A cranberry picking machine having stripping members to strip the berries from the vines, scoop members to scoop the berries from the strippers, a mount for said strippers and scoops, means for propelling the mount along on the ground, means controlled by the said propelling mechanism to actuate the strippers and scoops in opposite directions to each other, means whereby the strippers are caused to move on their stripping stroke in a direction opposite the general direction of travel of the machine and to have a return stroke in the general direction of the travel of the machine, and means whereby in the stripping stroke of the strippers they are caused to move in a substantially horizontal direction terminating in an upward stroke before the strippers begin their return stroke.

7. A cranberry picking machine having a supporting frame mounted on wheels, a rocker frame having picker fingers carried thereby, a carrier moving in an endless path and having a succession of scoops mounted thereon, which as the said scoop frame travels carries the scoops around with it, means for rotating the said wheels to propel the machine over the surface of the ground, means whereby the driving mechanism for the wheels also actuates the picker carrying frame to rock in a backward and forward direction when the machine is moving forward and means also actuated by said driving mechanism whereby the scoop carrier and scoops are caused to travel in the opposite direction to the direction of rotation of the wheels, and causes the scoops to scoop the contents of the picker fingers.

8. A cranberry picking machine having a main body and means for propelling it on the ground containing the cranberry vines, a swinging frame, a support mounted on said body with which said swinging support is oscillatably connected, means for actuating said swinging frame in a forward and backward direction, berry-picking members carried by said swinging frame, means for scooping the berries from the picking members, driving mechanism to propel the machine, and means whereby the said driving mechanism also actuates the picking members and the scoops.

9. A cranberry picking machine having a main body and means for propelling it on the ground, a toothed member for stripping the berries from the vines, and means whereby the driving mechanism for propelling the machine on the ground actuates the toothed picking member to reciprocate forward and back in the line of direction that the machine is propelled.

10. A cranberry picking machine having a main body and means for propelling it on the ground, a toothed member for stripping the berries from the vines, and means whereby the driving mechanism for propelling the machine on the ground actuates the toothed picking member to reciprocate forward and back in the line of direction that the machine is propelled, the teeth of the picking member being pointed in a direction opposite to that in which the machine is propelled whereby the stripping of the berries takes place during the stroke of the pickers in a direction opposite to the direction of travel of the machine.

11. A cranberry picking machine having a main body and means for propelling it on the ground, a toothed member for stripping the berries from the vines, means whereby the driving mechanism for propelling the machine on the ground actuates the toothed picking member to reciprocate forward and back in the line of direction that the machine is propelled, the teeth of the picking member being pointed in a direction opposite to that in which the machine is propelled whereby the stripping of the berries takes place during the stroke of the pickers in a direction opposite to the direction of travel of the machine, and means whereby the picking member may be adjusted so as to vary the height of its path of movement.

In testimony whereof I affix my signature.

WILLIAM B. CLAPP.